L. C. BAYLES.
FEED SCREW MECHANISM.
APPLICATION FILED OCT. 28, 1909.

959,911.

Patented May 31, 1910.

Witnesses:
F. George Barry
Henry Thieme.

Inventor:-
Lewis C. Bayles
by his attorneys
Brown & Seward

UNITED STATES PATENT OFFICE.

LEWIS C. BAYLES, OF JOHANNESBURG, TRANSVAAL, ASSIGNOR TO INGERSOLL-RAND COMPANY, OF NEW YORK, N. Y., A CORPORATION OF NEW JERSEY.

FEED-SCREW MECHANISM.

959,911.      Specification of Letters Patent.      Patented May 31, 1910.

Application filed October 28, 1909. Serial No. 525,001.

*To all whom it may concern:*

Be it known that I, LEWIS C. BAYLES, a citizen of the United States, and resident of Johannesburg, Transvaal, have invented new and useful Improvements in Feed-Screw Mechanism, of which the following is a specification.

This invention relates to certain improvements in feed screw mechanism and has for its object to provide very simple and effective means for taking up the wear between the feed screw and the parts being fed thereby and thereby preventing lost motion between the screw and the said parts.

This invention is particularly well adapted for use in connection with rock drilling machines.

Figure 1:
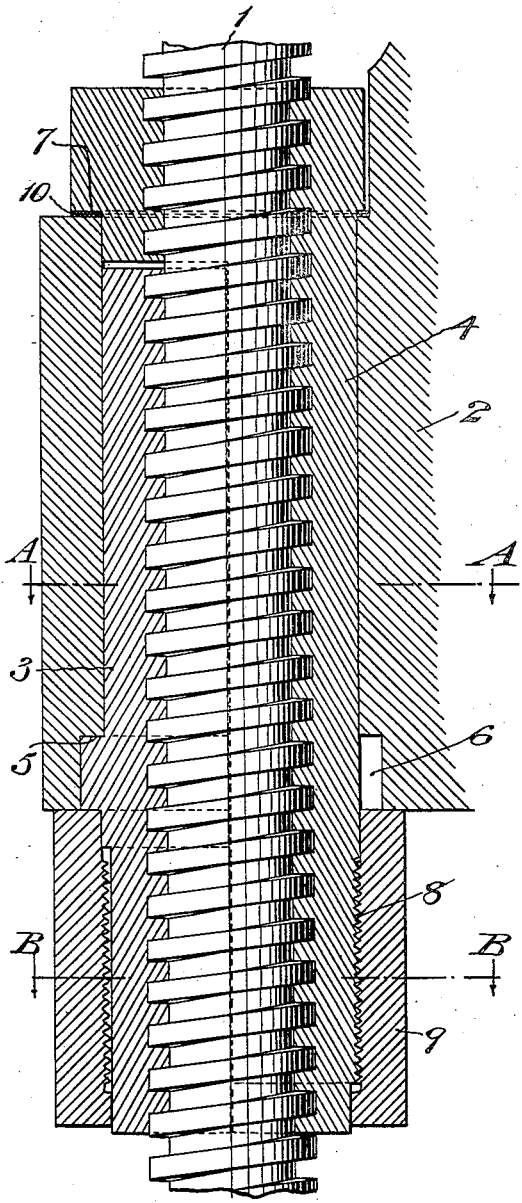
Figure 2:
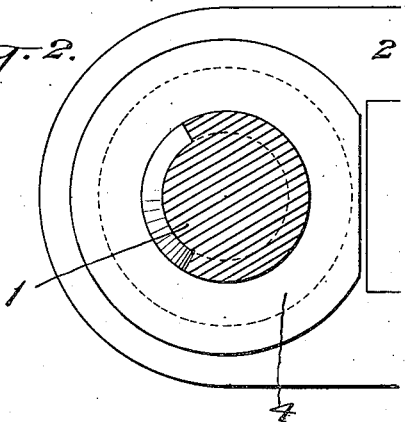
Figure 3:
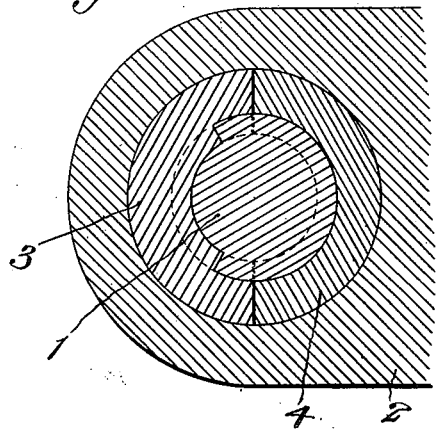
Figure 4:
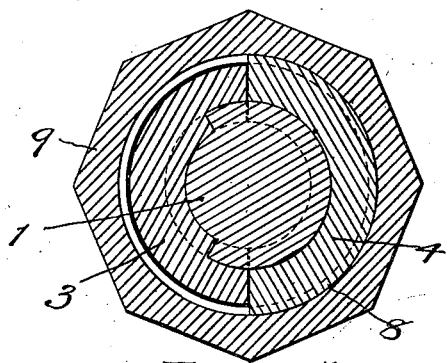

In the accompanying drawings, Figure 1 represents a portion of a feed screw in side elevation, the parts which coact therewith being shown in longitudinal central section, Fig. 2 is a detail view in end elevation, the feed screw being shown in section, Fig. 3 is a transverse section taken in the plane of the line A—A of Fig. 1, looking in the direction of the arrows, and Fig. 4 is a transverse section taken in the plane of the line B—B of Fig. 1, looking in the direction of the arrows.

The feed screw is denoted by 1 and the cylinder or other body which it is adapted to move is denoted by 2. This body 2 is provided with a hole through which the feed screw extends, the walls of the hole being spaced a sufficient distance from the screw to permit the insertion of a sleeve, which sleeve is divided longitudinally to form a stationary member 3 and an adjustable member 4.

Both the stationary and adjustable members have a screw threaded engagement with the feed screw 1.

The stationary member is provided intermediate its ends with a semi-cylindrical flange forming a shoulder 5, which shoulder is located within a recess 6 surrounding the hole through the body 2 at one end of said hole. The exterior of this stationary member 3 of the sleeve is of plain cylindrical form upon both sides of the flange which forms the shoulder 5.

The adjustable member 4 of the longitudinally divided sleeve is provided at one end thereof, exterior to the body 2, with a head forming a shoulder 7. The other end of this adjustable member is exteriorly screw threaded as shown at 8.

A lock nut 9 surrounds the plain semi-cylindrical end of the stationary member 3 and the screw threaded semi-cylindrical end of the adjustable member 4 exterior to the body 2, which nut serves to draw the adjustable member 4 inwardly toward the stationary member 3 of the sleeve when the said nut is screwed home.

In actual practice, one or more removable washers 10 are interposed between the bed 2 and the shoulder 7 formed by the head on the adjustable member 4 of the sleeve.

In actual practice it has been found that the wear between the feed screw and the sleeve takes place upon one face of each of the threads along one side of the screw and upon the opposite face of each of the threads along the other side of the screw. When it is desired to take up this wear, it can be accomplished by removing one of the washers 10 and then screwing the lock nut 9 home thus drawing the adjustable member 4 of the sleeve toward the stationary member 3 thereof.

What I claim is:—

1. A feed screw, a sleeve divided longitudinally to form stationary and adjustable members both having a screw threaded engagement with said screw, said members having oppositely arranged shoulders, a body interposed between said shoulders and a nut having a screw threaded engagement with the adjustable member for drawing it toward the stationary member to take up wear on the screw.

2. A feed screw, a sleeve divided longitudinally to form stationary and adjustable members both having a screw threaded engagement with said screw, said members having oppositely arranged shoulders, a body interposed between said shoulders, a nut having a screw threaded engagement with the adjustable member for drawing it toward the stationary member to take up wear on the screw, and one or more removable washers interposed between the said body and the shoulder on the adjustable member.

3. A feed screw, a sleeve divided longitudinally to form stationary and adjustable members both having a threaded engagement with said screw, said members having oppositely arranged shoulders, a body interposed between said shoulders, the stationary member having a plain semi-cylindrical portion and the adjustable member a screw threaded semi-cylindrical portion exterior to the body and a nut surrounding said end and engaging the screw threaded portion on the adjustable member for drawing the same toward the stationary member.

In testimony, that I claim the foregoing as my invention, I have signed my name in presence of two witnesses, this twenty-seventh day of October 1909.

LEWIS C. BAYLES.

Witnesses:
F. GEORGE BARRY,
C. S. SUNDGREN.